(No Model.)

R. S. KELSCH.
JOINT FOR INSULATED ELECTRIC WIRES.

No. 551,166. Patented Dec. 10, 1895.

Witnesses:
Chas. E. Gaylord
Little J. Alter

Inventor:
Raymond S. Kelsch
By Dyrenforth & Dyrenforth
Attys.

UNITED STATES PATENT OFFICE.

RAYMOND S. KELSCH, OF CHICAGO, ILLINOIS.

JOINT FOR INSULATED ELECTRIC WIRES.

SPECIFICATION forming part of Letters Patent No. 551,166, dated December 10, 1895.

Application filed December 22, 1894. Serial No. 532,627. (No model.)

*To all whom it may concern:*

Be it known that I, RAYMOND S. KELSCH, a citizen of the United States, residing at Chicago, in the county of Cook and State of Illinois, have invented a new and useful Improvement in Joints for Insulated Electric Wires, of which the following is a specification.

My invention relates to improvements in insulating connecting-joints for the section ends of electric wires or cables generally, and, more especially, of underground conductors.

My object is to provide a joint-making coupling of improved construction, and means for insulating the same, all of which may be easily and quickly applied at comparatively small cost, and afford a ready means, when necessary to test the conductor, for separating and reattaching the wire or cable sections.

Figure 1:
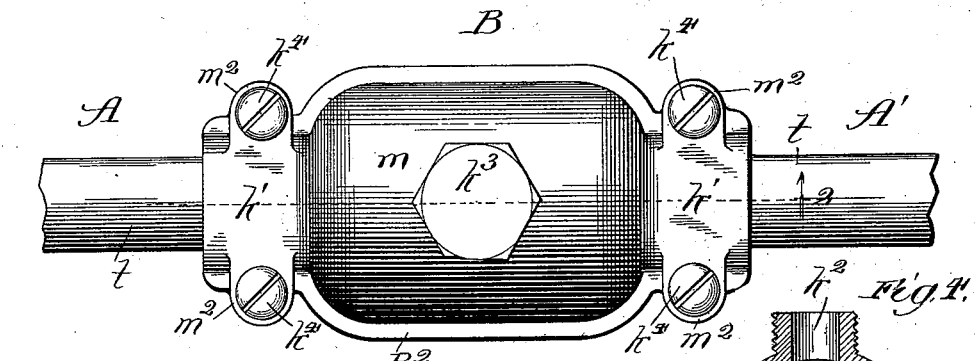
Figure 4:
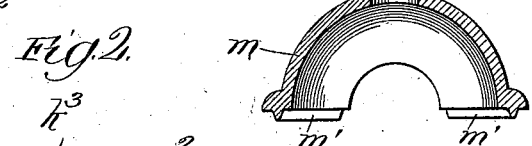
Figures 2, 3:
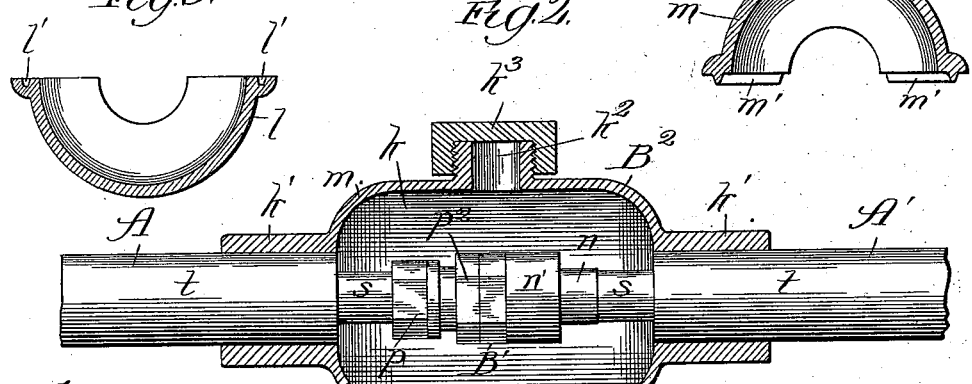
Figure 6:
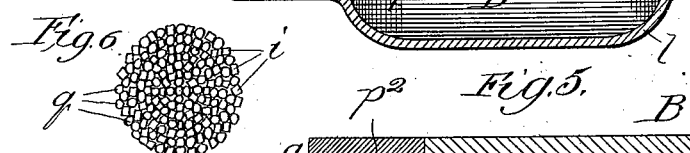
Figure 5:
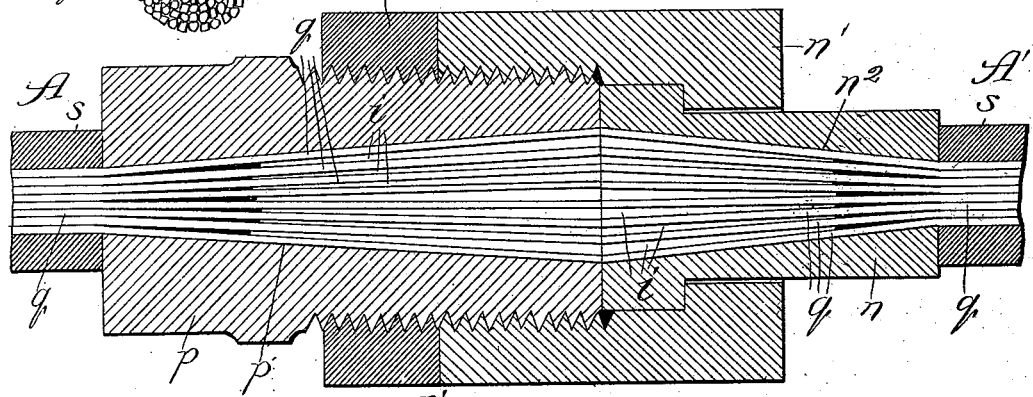
Figure 7:
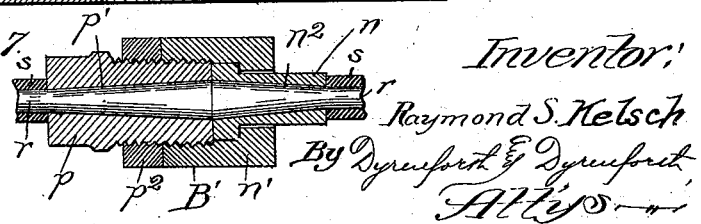

In the drawings, Figure 1 is a broken view in elevation of an insulated and metal-covered wire or cable provided with my improved joint; Fig. 2, a section on line 2 of Fig. 1; Figs. 3 and 4, cross-sections of the separable members of a joint box or envelope; Fig. 5, an enlarged longitudinal sectional view showing my improved means for coupling cable-sections together; Fig. 6, an end view of a cable, showing my improved means for expanding the same in the coupling; and Fig. 7 a broken longitudinal section showing the manner of securing single wire sections together.

A and A' are the sections respectively of an electric conductor, each of which may be formed with a metal, usually lead, outer covering $t$, insulation $s$ and an inner wire $r$ or cable $q$.

B is my improved joint comprising an attachable and detachable coupling B' and an outer box or envelope B$^2$. The couplings and the boxes are made of various sizes to fit conductors of any standard size. The coupling B' comprises a sleeve or member $p$ threaded along its outer portion and provided with a central opening $p'$ through it, made flaring, preferably, from one end to the other, and a coupling member consisting of a sleeve $n$ carrying a swiveled socket-piece $n'$ and having an opening $n^2$ through it flaring preferably from one end to the other. On the threaded portion of the coupling member $p$ is a jam-nut $p^2$. The box B$^2$ is formed of two members, $m$ and $l$. The box member $l$ is provided in its meeting edges with a groove $l'$, and the member $m$ is provided with tongues $m'$. When fitted together the tongues $m'$ of the box member $m$ enter the grooves $l'$ of the box member $l$ and the members together form a chamber $k$ provided at opposite ends with hollow tubular sleeves $k'$, which fit snugly over the lead coverings $t$ of the conductor-sections. At its center the member $m$ is provided with a hollow tubular extension affording a filling-opening $k^2$, upon which fits a screw-cap $k^3$. The box member $m$ is provided toward each end, and at opposite sides, with perforated ears $m^2$, and the box member $l$ is provided with ears or projections coincident therewith having threaded sockets which register with the perforations in the ears $m^2$. Screws $k^4$ pass through the perforated ears $m^2$ into the threaded sockets of the section $l$, and fasten the box members firmly together. The tongue-and-groove connection between the box members, and the closeness of the fit of the sleeves $k'$ upon the lead coverings $t$ of the wires, may render the tube $k$ practically water-tight.

To couple together the two sections $r$ of a single wire conductor the lead covering $t$ is cut away, as indicated in Fig. 2, to expose the insulation $s$, and the said insulation on one wire section is cut away to permit the sleeve or coupling member $p$ to be slipped upon the wire and extend at the small end of its flaring opening against the end of the insulation. The wire should extend slightly beyond the end of the coupling member $p$ and should then be hammered inward at its end to expand it in the coupling member to fill out the flaring opening $p'$. The end of the wire is then, if necessary, filed off so that it will extend at its enlarged end flush with the end of the coupling member $p$. The insulation $s$ of the other wire section $r$ is cut away to permit the sleeve or coupling member $n$ to be slipped upon the wire and abut at the small end of its flaring opening $n^2$ against the insulation. The wire should project slightly beyond the end of the coupling and be hammered or upset to fill out the flaring opening $n^2$, when it may be filed or smoothed off at its end to extend flush with the end of the sleeve $n$. The swiveled piece $n'$ is then screwed upon the sleeve $p$ until the flared or expanded ends of the wire sections $r$ are brought into contact, and the jam-nut $p^2$ is then tightened against the swiveled piece to hold it firmly in place. The expansion of the ends of the wire $r$ in the coupling members $p\ n$ causes them to be held with great firmness, while the jointed and abutting ends of the wire sections produce a contact of such large area that all danger of current retardation and consequent heating of parts is obviated.

In all couplings hitherto employed, wherein the current is conducted from one wire section to another through the coupling members alone, there is always danger that the joint, unless very carefully and skillfully made, will have a retarding effect upon the electric current, and consequently burning out of the wires at couplings is a frequent occurrence. In my improved coupling the expanded ends of the wire sections abut and are clamped tightly together so that the area of the wire at the joint is larger than at any other part, and perfect contact is effected, so that the current may travel through the wire and not necessarily over the coupling.

When the wire sections $r$ are coupled, as described, the box members are fitted together, as shown in Figs. 1 and 2, and the chamber $k$ filled with insulating material, which is poured through the opening $k^2$. When the insulating material has hardened and the cap $k^3$ been screwed into place, the joint is completed.

In coupling the ends of cable-sections $q$ together the lead covering $t$ and insulation $s$ are cut away, the same as in the case of a single wire. When the sleeves $n\ p$ are passed over the ends of the cable-sections against the insulation $s$ the cable-wires should project slightly beyond the flared ends of the sleeves. To expand the cable ends in the flaring openings $n^2\ p'$ tapered hard-copper pins $i$ are driven inward between the wires, as shown in Figs. 5 and 6, until they, with the wires thus separated and relatively expanded, completely fill out the tapered openings. The ends of the wires and pins projecting beyond the ends of the sleeves are then filed and smoothed down to extend flush with the meeting faces of the coupling members, whereby the ends of the cable will present approximately continuous, smooth and expanded surfaces, which meet throughout their areas when clamped together by the coupling.

Besides producing a joint practically without break in the wire the coupling may be readily separated when it is desired to test the wires, and as readily brought together again. If desired, the coupler B' may be wrapped in a sheet or strip of oiled paper or the like before the chamber $k$ is filled with insulating compound, whereby the latter will not stick to the coupling, and may be readily removed when it is desired to break the joint.

Constructed as described my improved joint is in every way desirable for its purpose, being of comparatively small initial cost, readily applied, requiring no skilled labor, and easy to separate and attach again whenever it is desired to test the wire; and, while I prefer to employ the construction throughout as shown, the construction may be modified in the matter of details, without departing from the spirit of my invention as set forth in the claim.

What I claim as new, and desire to secure by Letters Patent, is—

An attachable and detachable joint for electric conductors, comprising, in combination, a coupling consisting of an externally threaded sleeve provided with a jam-nut and a sleeve provided with a swiveled nut to receive the externally threaded sleeve and be engaged by the jam-nut to clamp the parts securely together, the sleeves having flaring openings through them to receive and hold in contact the flared and jointed ends of conductor sections, and an envelope for the coupling, comprising separable box members with means for securing them together, affording a chamber for insulating material and fitting at its ends the conductor sections, substantially as described.

RAYMOND S. KELSCH.

In presence of—
M. J. FROST,
J. H. LEE.